PROGRAMMING MECHANISM

Filed March 13, 1957

INVENTORS
Anthony Flan
Harold R. Miller
BY Frost & Verhoeven
Attorney

INVENTORS
Anthony Flan
Harold N. Miller
BY Frost & Verhoeven
Attorney 2,968,746

PROGRAMMING MECHANISM

Anthony Flan, Evanston, and Harold N. Miller, Glencoe, Ill., assignors to Oakton Engineering Corporation, Skokie, Ill., a corporation of Illinois Filed Mar. 13, 1957, Ser. No. 645,714

6 Claims. (Cl. 317—139)

Our invention relates to an improved programming mechanism in which a series of electrically controlled devices are energized in succession in response to control signals on a tape and at the end of the program the device is reset to begin a new cycle when desired.

Advertising displays and the like are particularly effective if they automatically execute a preset program upon actuation of a start switch. Such a program may include a voice, music, or both recorded on a continuous tape or wire (magnetically or otherwise), coupled with illuminated or animated displays, slides, or other electrically controlled display devices which are energized in succession as the program proceeds. In the apparatus described herein this actuation is automatically provided for the use of a tape or wire sound reproducer which also carries a series of short control signals and a single long termination signal. The unit is put in operation by actuating a start switch which initiates movement of the record medium (tape or wire) over the reproducing head to reproduce the audible program. This program continues until the long termination signal—recorded on the tape or wire—is reached, at which time the apparatus shuts off at the end of the long termination signal. Intermittently, as the short control signals on the tape or wire are reached, a stepping switch is actuated to advance a commutator from one switch position to the next and thereby energize lights, animated displays, slide projectors, and the like to accompany the audible program. When the long termination signal is reached, the stepping switch is reset to condition the apparatus for a completely new cycle upon fresh actuation of the start switch.

The tape or wire reproducer used with the apparatus herein described is of the kind shown and described in our copending patent application, S.N. 517,016, filed June 21, 1955, entitled Control Mechanism Responsive to a Recorded Signal, now Patent No. 2,787,669.

In brief, this apparatus includes a continuous loop tape or wire which carries both an audible program and recorded short and long control and termination signals. The apparatus, when energized, moves the wire or tape over a reproducing head to reproduce as time varying voltage the recorded program and signals. The audible program is reproduced by a suitable speaker, whereas the control signals are applied to a relay which—due to the circuitry described in the above-identified application—responds only to those signals. In the particular apparatus herein described this relay has a pair of normally closed contacts which open when the control signal is present.

It is therefore a general object of the present invention to provide an improved programming mechanism in which a plurality of electrically controlled devices are actuated in sequence during a preset program and at the conclusion thereof the mechanism is conditioned for a new cycle.

A further object of the present invention is to provide an improved programming mechanism for use with a tape or like reproducer which reproduces an audible program and in addition creates the requisite control signals.

Still another object of the present invention is to provide an apparatus of the above type in which long and short signals are used to energize the respective controlled devices and to arrest the operation of the mechanism at the end of the cycle.

Yet another object of the present invention is to provide an improved device in which the control functions take place at the end rather than at the beginnings of the respective signals.

It is an additional object of the present invention to provide an improved programming mechanism in which the end of the program is sensed by the presence of a long control signal which may be of any length over a minimum duration, the mechanism is thereupon conditioned to stop, and thereafter the mechanism does stop when the end of the long control signal is reached.

Further it is an object of the present invention to achieve the above object by the use of a circuit in which the apparatus is energized through alternate circuits, one of which provides energization during the normal course of the program cycle and other of which energizes the apparatus for the period of time the long control signal continues after the first circuit becomes ineffective.

The novel features which we believe to be characteristic of our invention are set forth with particularity in the appended claims. Our invention itself, together with further objects and advantages thereof, will best be understood by reference to the following description taken in connection with the accompanying drawings, in which:

Figures 1, 3:
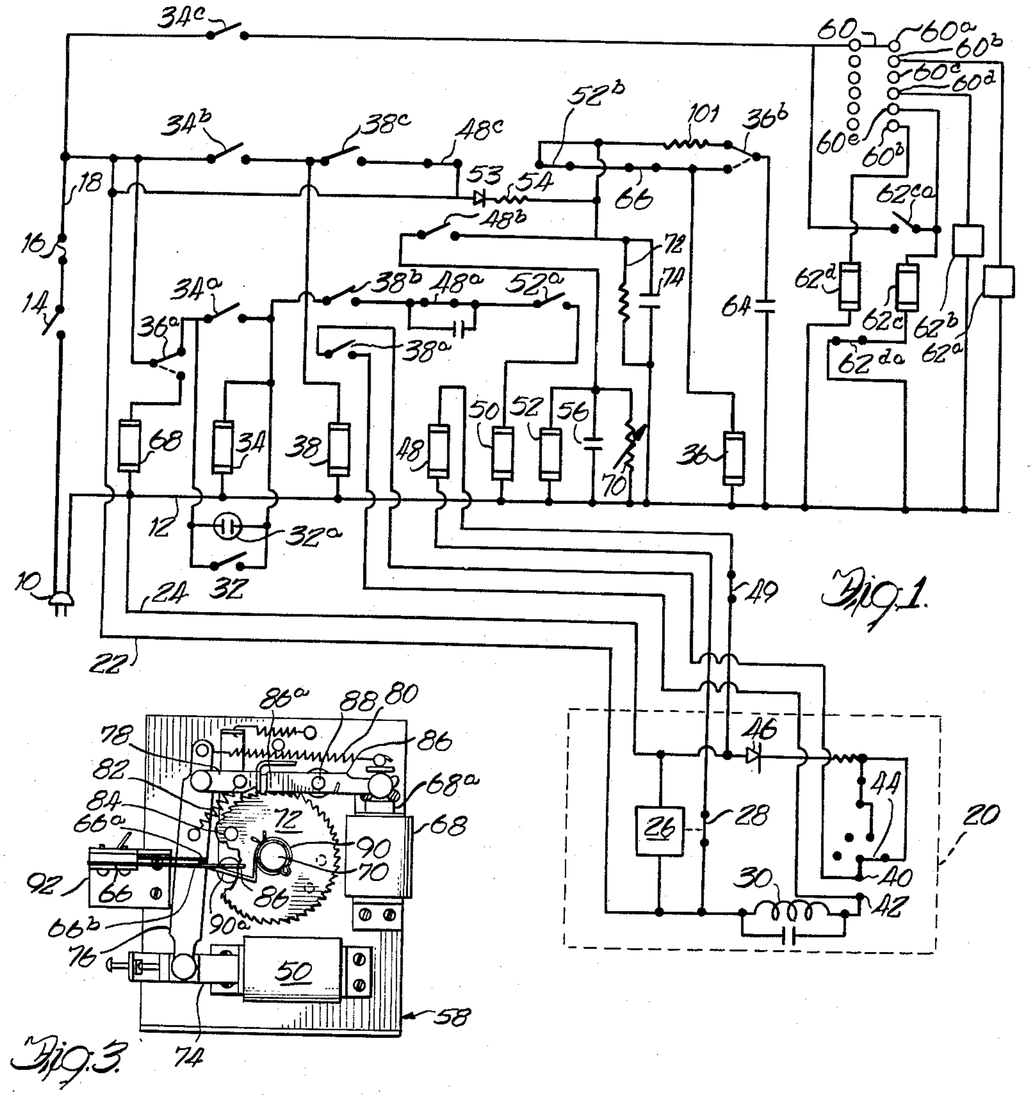
Figure 1 is a schematic circuit diagram of the apparatus of the present invention, with the reproducer shown in partially block form.
Figures 2 and 3 are views of the stepping switch mechanism from the rear and front, respectively.

The construction and operation of the apparatus of the present invention is best described by considering the sequence of operation. Energy is supplied to the apparatus from the appliance plug 10, which is plugged into a suitable outlet to receive 110 volt alternating current. One wire from the plug 10 is the common or ground connection 12. The other conductor from the plug 10 is connected to the manual on-off switch 14 and thence to the fuse 16 to the other energizing conductor for the apparatus, indicated at 18.

The reproducer and controller is indicated at 20. It receives energizing current from the conductors 12 and 18, through the conductors 22 and 24, respectively. This current is continuously applied to the control and signal generating circuits indicated generally at 26. These circuits include vacuum tubes, relays, the capstan drive motor, and the like that must be energized to reproduce the audible program and the signal from the wire or tape as well as the relays and other circuits that respond to the control signals to open contacts 28 when control signal is present and to close those contacts when the control signal is absent. One form of such circuits is shown in our copending application above-identified. By maintaining the control and signal generating circuits continuously energized, the apparatus reproduces sound and signal immediately upon energization of the solenoid 30 which serves to pull the pinch roller against the capstan and thereby cause the capstan to drive the tape or wire over the reproducing head to reproduce the signals and sound program.

The apparatus is started on the program to be repeated by momentary closure of the start switch 32. This switch may be in the form of a manually operated button located where it may be depressed by the observer. Alternatively it may operate in response to walking of a person over a pressure sensitive tread or may operate when a person interrupts a light beam. When this switch is closed, energy is supplied to the power relay 34. The energizing circuit to this relay may be traced from conductor 18 through the contacts 36*a* of the shutoff relay 36 (which make the circuit as shown when the relay 36 is unenergized) to the start switch 32 and thence through the relay 34 to the conductor 12. When the power relay 34 is thus energized it seals in through the normally open contacts 34*a* which shunt the start switch 32 and hold the power relay energized until the shutoff relay is energized as is hereinafter described.

Pickup of the power relay 34 also closes the normally open contacts 34*b*. These contacts serve to feed power to the drive relay 38, the energizing circuit running from conductor 18 through the contacts 34*b* (now closed) and relay 38 to the conductor 12. Pickup of relay 38 thereupon establishes a circuit between the terminals 40 and 42 of the reproducer and controller 20.

When the circuit is made between the terminals 40 and 42, the pinch roller pull-in solenoid 30 is energized. This energizing circuit may be traced from conductor 18 to conductor 22, through the solenoid 30, to terminals 40—42, to the selector switch 44, and thence to the rectifier 46, conductor 24, and conductor 12 to complete the circuit. Terminal 42 is connected to terminal 40 through the normally open contacts 38*a* of the relay 38. When the solenoid 30 is thus energized it mechanically pulls a pinch roller (not shown) towards the capstan which is rotated by a motor energized through the circuits 26. The tape or wire is interposed between the pinch roller and the capstan to impart movement to the tape or wire when the pinch roller is drawn against the capstan by the action of the solenoid under the current flow from rectifier 46. When the tape or wire is thus started, it travels over the pickup head (not shown) to reproduce as a time varying voltage the audio program and the control signals recorded on the tape or wire. The audible program accordingly starts and the apparatus is subjected to the effects of the control signals when these occur. A suitable capstan and pinch roller construction for use in the above-described apparatus is shown in our above-identified application.

The synchronization relay 48 is energized through the normally closed contacts 28. These contacts are on a relay (not shown) forming part of the circuits 26 and are in normally closed condition. They open only when a control signal—such as 25 cycle signal—is reproduced from the tape or wire. They are not affected by the audible program material. One apparatus for this purpose is shown in our above-identified copending application. When the contacts 28 are closed, the relay 48 is energized through the circuit which may be traced from conductor 18 to conductor 22 to contacts 28 and thence to the relay 48. The remainder of the circuit may be traced from the relay 48 through the normally closed manual step switch 49 to conductors 24 and 12. Pickup of the relay 48 through the above-described circuits serves to open the contacts 48*a* and 48*c*, both of which are normally closed sets of contacts, and closes contacts 48*b*, which are normally open.

The above-described operations also serve to pick up the resynchronization relay 52. The energizing circuit to this relay is traceable from the conductor 18 to the rectifier 53 and resistor 54 to the contacts 48*b* of synchronization relay 48 (now closed since relay 48 is energized through contacts 28) and thence to the relay 52 back to the conductor 12. The energizing of relay 52 through this circuit also serves to charge the capacitor 56 due to the voltage drop across the energizing coil of relay 52.

By reason of the above-described operations the tape or wire is brought into motion and the audible and control signals reproduced in accord with the program recorded on the tape or wire. The apparatus is also conditioned to respond to control signals, particularly by reason of the charge on the capacitor 56. When the tape or wire crossing the reproducing head has a control signal (such as a 25 cycle control signal), the contacts 28 are opened in response to such signal. The synchronization relay 48 is thereupon deenergized; the contacts 48*a* and 48*c* closed; and the contacts 48*b* opened. This serves to energize the stepping coil 50, since the relay 52 remains energized momentarily by reason of the charge on capacitor 56.

By the action hereafter described in detail, energization of the stepping coil 50 serves to condition the stepping switch 58, Figures 2 and 3, to advance one step when the current flow through the coil 50 thereafter falls below a preset value. The contact arm of the stepping switch is shown diagrammatically at 60, Figure 1 (and physically at 60, Figure 2), and has a common terminal which is energized from conductor 18 through the normally open contacts 34*c* of the power relay 34. Thus, in the action above described, where the unit is operating and a control signal has caused contacts 28 to open, power is supplied to the common terminal of the stepping switch through the closed contacts 34*c* of the power relay 34. The selected contacts of the stepping switch are indicated at 60*a*, 60*b*, 60*c*, etc., and are connected to a series of electrically operated display devices, indicated at 62*a*, 62*b*, 62*c*, etc. As the stepping switch arm 60 makes contact successively with the contacts 60*a*, 60*b*, etc., the respective display devices are energized in accordance with their connections to the various contacts 60*a*, 60*b*, etc. In the specific connections shown in Figure 1, the energization of the stepping coil 50, followed by its deenergization, advances the arm 60 from the terminal 60*a* to terminal 60*b* and thus energizes the display device 62*a*. The actual advance of the arm 60 takes place at the end of the control signal (i.e., the time when contacts 28 close).

The control signals (which may be of number corresponding to the control functions desired) are of comparatively short duration in order to advance the stepping switch 58 the steps required to provide the sequential operation of the various devices to be energized during the course of the audible program. Each of these signals comes to an end before the capacitor 56 has discharged sufficiently to release the relay 52. In other words, the contacts 28 reclose (due to the discontinuance of the control signal) while the resynchronization relay 52 is still energized. When the contacts 28 reclose, the synchronization relay 48 picks up, thereby opening contacts 48*a* and 48*c* and closing contacts 48*b*. The resynchronization relay 52 is now energized through the rectifier 53, the resistor 54, and the closed contacts 48*b*. The capacitor 56 is now charged to its normal state of charge in preparation for another control signal, and the unit is then operating in the same fashion as before the control signal occurred.

The operation above described continues under the influence of the respective short control signals to step the stepping switch to energize in succession the respective display or other devices 62*a*, 62*b*, etc. The operation of the entire system is brought to a close by the occurrence of the long termination control signal, which will now be described.

At its inception the termination control signal serves to open the contacts 28 and brings about the same events as are above described in connection with a short control signal. That is, the synchronization relay 48 drops out, the resynchronization relay 52 holds in due to the current flow from the capacitor 56, and the stepping solenoid 50 is energized. However, with the long control signal. the capacitor 56 discharges sufficiently to cause the relay 52 to drop out while the signal is still present, and while the contacts 28 are still opened. This dropout opens contacts 52*a* and closes contacts 52*b*. Upon opening contacts 52*a*, the stepping switch advances one step, since the stepping solenoid 50 is now deenergized, and the return spring in the stepping switch takes control to move the pawl and advance the ratchet wheel one step as hereafter described. This gives rise to no action other than to deenergize immediately the last device 62*a*, 62*b*, etc., if any such device is energized at the moment the last control signal becomes effective.

Deenergization of resynchronization relay 52 serves an additional function in that it sets in motion the sequence of events that ultimately shut down the unit. When the contacts 52*b* close, the shutoff relay 36 is energized. This energizing circuit may be traced from the conductor 18 to rectifier 53 and resistance 54 to contacts 52*b*, now closed. The circuit can then be traced to the contacts 66 and the relay 36 to line 12. The contacts 66 are on the stepping switch and are opened when the stepping switch is in the home or initial position. Since at this time the stepping switch has advanced beyond the home position, the contacts 66 are closed. Pickup of relay 36 releases the stepping switch mechanism 58 to return to home position (as is hereafter described) and thus causes contacts 66 to open. However, since contacts 36*b* establish an energizing circuit from capacitor 64 to relay 36, relay 36 remains picked up for a period of time after contacts 66 are opened.

Prior to the above action the condenser 64 is charged through conductor 18, rectifier 53, and resistor 54 to the resistor 101. The normal.y closed contacts 36*b*, capacitor 64 and line 12 complete this circuit. When relay 36 is initially energized (contacts 66 still closed because the step relay has not yet returned to home position) the condenser 64 remains charged because of the voltage drop across relay 36.

Energization of the shut off relay 36 shifts the contacts 36*a* from the solid line position of Figure 1 to the dotted line position. This has two effects. First, it energizes the stepping switch reset solenoid 68 to release the latch mechanism on that switch (as hereinafter described) and to cause that switch to restore itself to the home position. When the reset operation is completed and the switch has returned to the home position, the contacts 66 open to break the initial energizing circuit to shutoff relay 36. That relay is thereupon energized momentarily by (i.e. a few seconds) reason of capacitor 64 and contacts 36*b* (in the dotted position), after which time the relay 36 drops out and is conditioned for a new cycle. Before relay 36 is deenergized, however, the shifting of contacts 36*a* to the dotted line position breaks the energizing circuit to the power relay 34, thus causing that relay to drop out and opening contacts 34*a*, 34*b*, and 34*c*. This action also serves to break the normal energizing circuit to the relay 38, since the contacts 34*b* are now opened.

The above action does not, however, result in drop out of the drive relay 38, since this relay is energized through the alternate circuit which may be traced from the conductor 18 through the now-closed contacts 48*c* of the synchronization relay 48 and the contacts 38*c* of the drive relay 38. So long as the signal remains on the tape or wire, so that the contacts 28 are open, the synchronization relay 48 remains deenergized and the contacts 48*c* are closed. Thus the terminals 40 and 42 remain connected through the contacts 38*a* of the drive relay and the pinch roller pull-in solenoid 30 remains energized to keep the tape or wire moving. However, when the signal on the tape or wire comes to an end, the contacts 28 now reclose, the synchronization relay 48 picks up, the contacts 48c open and the alternative energizing circuit to the drive relay 38 now breaks to deenergize that relay and cause the terminals 40 and 42 to be disconnected, thereby interrupting the power to the pull-in solenoid 30 and bringing the drive action to an end. Since at this time the power relay 34 is also deenergized, and all of the other relays and solenoids are deenergized, the mechanism is now restored to the initial condition it had when the start switch 32 was closed momentarily. In other words, the mechanism is now conditioned for a new cycle of operation.

The variable resistance 70 serves to control the time during which the capacitor 56 holds the relay 52 in the picked up condition. It is adjusted at a value that assures the drop out of the relay 52 during the long termination control signal while at the same assuring the maintenance of that relay in the picked-up condition during each of the short control signals.

Capacitor 74 serves to stabilize the voltage at the resistance 54, thus prevents the voltage drops that would otherwise occur when the capacitors 56 and 64 are connected to that resistor. Resistance 72 additionally contributes to the maintenance of the voltage at the resistance 54 by maintaining a constant current drain and thereby avoiding the voltage peaks that might otherwise develop.

It will be noted that the mechanism does not shut off until the long termination control signal has come to an end. Moreover, it is immaterial how long this signal actually is, because the drive continues until that signal terminates. This is an important feature of the present invention, inasmuch as it provides considerable flexibility to the mechanism by making it possible to accommodate the system to programs of various length and provides a positive action of the unit by assuring that the end of the signal has been reached before the unit shuts off. This latter feature is of special importance because any control signal on the tape or wire after shut down will reappear when the start switch 32 is actuated, and will cause stepping of switch 60, or even a new shutdown.

Figure 4:
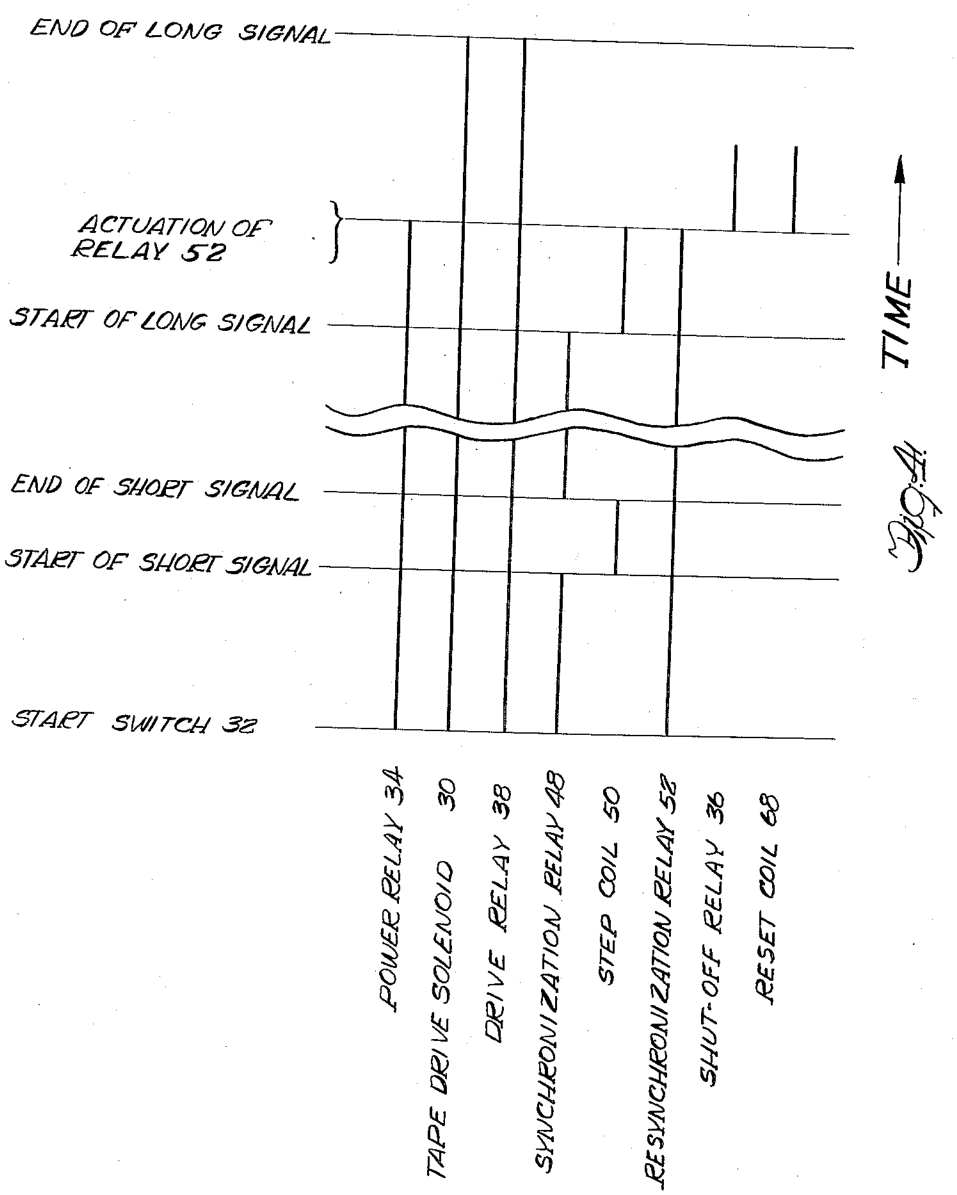
Figure 4 is a diagram showing the sequence of operation of the parts of the mechanism.

Figure 4 shows the operation of the apparatus in chart form. When the start switch 34 is closed momentarily, the power relay 34, the tape drive solenoid 30, the drive relay 38, the synchronization relay 48 and the resynchronization relay 52 all close due to the successive closure and seal-in action described above. The unit is now reproducing the program and conditioned to execute the sequential control functions. When the short signal comes on, as is shown in the chart, synchronization relay 48 drops out and the step solenoid 50 picks up. Termination of the short signal deenergizes the step solenoid or coil to advance the stepping switch 58 one position, and the synchronization relay now picks up again, all as is described above. During this action the resynchronization relay 52 maintains its pulled-in position since the capacitor 56 does not have time to discharge to the voltage at which the relay 52 drops out. When the long signal appears, the synchronization relay 48 drops out, as shown, and the step coil 50 is energized. Thereafter—after a time period exceeding the duration of the short signals—the resynchronization relay 52 drops out due to the discharge of capacitor 56, and the shutoff relay 36 picks up to energize reset coil 68 and to deenergize power relay 34 as is above described. The tape drive solenoid 30 and the drive relay 38, however, remain energized through the alternative energizing circuit to drive relay 38. Upon termination of the long control signal, the drive relay 38 drops out, the solenoid 30 is deenergized and the apparatus is restored to the condition existing at the beginning of the cycle of operation. The shut off relay 36 independently drops out when the capacitor 64 discharges sufficiently.

In an apparatus constructed in accordance with the above description, the following circuit values were used:

| | | |
|---|---|---|
| Resistance of relay 52 | ohms | 20,000 |
| Capacitors 74 and 64 | microfarads | 30 |
| Resistance of relay 36 | ohms | 20,000 |
| Capacitor 56 | microfarads | 100 |

Aside from relays 36 and 52, which are D.-C. relays, the relays are all of the alternating current type.

Figure 2:
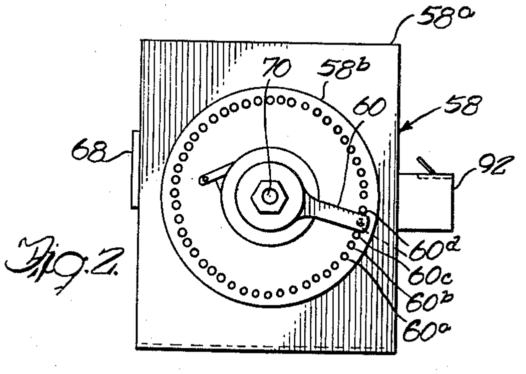

As shown in Figures 2 and 3, the stepping switch 58 includes a main support panel 58a and an insulated sub-panel 58b, the latter carrying a series of selector contacts 60a, 60b, 60c, etc., as shown. The contact arm 60 is carried on the shaft 70 that also carries the ratchet wheel 72. The ratchet wheel has a number of teeth equal to the number of fixed contacts 60a, 60b, etc. The switch also has a stepping solenoid 50 adapted to advance the ratchet wheel 72 one step for each pulse it is energized. Pull-in of the plunger 74 acts through the rocker link 76 to pull the ratchet arm 78 in the left hand direction of Figure 3 against the bias of spring 80. Arm 78 is normally held in ratchet engagement with the wheel 72 by the spring 82. Upon release of the plunger 74 (by deenergizing the step solenoid 50), the spring 80 takes over to pull the arm 78 back to the position of Figure 3 and thereby rotate the ratchet wheel 72, and the arm 60 one step. Thus the solenoid 50, when energized and then deenergized, serves to advance the step switch 58 in successive steps at the instant the solenoid 50 is deenergized.

On the back side of the ratchet wheel 72, the stepping switch has a pin 84. When the switch is in the home position this pin engages the flexible switch arm 86 which protrudes into the path of travel of this pin. The arm 86 is thereupon flexed down to break the contacts 66a and 66b which together define the switch 66, Figure 1. It will be noted that this action serves to hold the switch 66 in closed position when the stepping switch 58 is away from the home position and to open the contacts 66 when the switch 58 is restored to the home position.

The stepping switch release solenoid is indicated at 68, Figure 3. The plunger 68a of this solenoid is pinned to the rocker 86 which is pivotally mounted on the pin 88. When the solenoid 86 is energized, the plunger 68a is pulled down to rock the lever 86 in the clockwise direction as seen in Figure 3. This lifts the left hand end 86a of the rocker 86 to lift the ratchet pawl arm 78 and thereby release the ratchet wheel 72. The wheel 72 is then returned to home position under the bias of the helical spring 90 which is affixed at one end to the shaft 70 and at the other end, 90a, is mounted on the panel anchored to the support bracket 92 which carries the switch 66.

We have here described a specific form of the stepping switch 58, and a particular form of the reproducing device 20, although, of course other forms of both of these mechanisms may be used without altering the operation of the overall mechanism here described and claimed.

In the appended claims the operation of the reproducing device 20 in creating a control signal is described broadly as a "control function." In the apparatus herein described this control function consists of the opening of the contacts 28. Alternatively, the control function might be effected by the direct connection of the synchronizing relay 48 to the circuits 26 to provide voltage at relay 48 except when the control operation is desired. In still another arrangement, the contacts 28 may be on a switch mechanically operated by the recorded tape (as for example by providing a thicker tape section at the points where the long and short control functions are desired). Since the particular form of the apparatus in this respect is not the essence of the present invention, so long as the short and long control functions are made avialable, the broad term "control function" is used generically to describe all such apparatus.

An additional feature of the present invention lies in the flexibility of the apparatus. For practical reasons, the time period for a complete cycle of the tape or wire program reproducing mechanism 20 is a standard period, say 5 minutes. The actual program, both visual and audible, in essentially all cases requires a smaller time period, say 2 minutes, which means that for 3 minutes of each cycle the unit must operate silently and without any visual signal. This is done in the following manner. With respect to the audible signal, the tape or wire (or other medium) upon which the recording is made has no audible recording after the program concludes, so that the tape or wire runs silently until the unit shuts off. With respect to the visual program, a short control signal is used to terminate the action while allowing the machine to continue operation otherwise.

The visual program contains two components. First, there are loads, such as 62b and 62a, Figure 1, which are continuously energized while the step switch arm 60 dwells on the appropriate contact. As these deenergize when the step switch next advances, they present no problem of termination prior to restoration of the step switch to home position. Other visual program loads, however, are permanently energized when the appropriate step switch contacts are reached. Thus the load 62c, Figure 1, is in the form of a relay having normally open contacts 62ca which seal it in energized condition once arm 60 reaches contact 60e. Other contacts on relay 62a (not shown) may energize lights or other visual program components. In order to deenergize the relay 62c before the unit finally stops, the load 62d is made in the form of another relay, having normally closed contacts 62da. When the step switch is actuated (by the short control signals) to reach contact 60f, the relay 62d is energized, the contacts 62da open, the energizing circuit to relay 62c is now broken and the latter relay drops out.

If during the course of the visual program there are a plurality of loads like relay 62c that seal in, they may all be deenergized simultaneously by the action of the relay 62d. Alternatively, they may be individually deenergized at times fixed by advance of the step switch to energize individual deenergizing relays as desired. In this fashion the visual or other program controlled by the stepping switch is brought to an end before the long signal begins.

An additional element of convenience and flexibility is provided by the fact that the long control signal may be any length in excess of a minimum and accordingly can serve to bridge the time between the end of the visual program and the time the unit is to be deenergized. If the time required for this purpose is very long, however, it is preferable to use a relay such as 62d since this permits the various relays in the control mechanism proper to have their normal energized or deenergized states during the "dead" period and permits the use of some relays (such as shut off relay 36) which have only a short time rating.

If desired a normally closed manually operated switch 49 may be provided to permit manual deenergization of the relay 48 to simulate the action of the short or long control pulses and thereby manually control machine operation.

Also, if desired, a socket 32a may be provided to receive the connecting cord to a remote manually operated start switch. Such switch may, for example, be in a tread operated by the foot pressure of a person walking thereacross.

While we have shown and described a particular embodiment of the present invention, it will of course be understood that other embodiments and alternative constructions may be used without departing from the true spirit and scope of the invention. By way of further example, and not by way of limitation, the circuitry 26 might be so arranged that it develops the energizing voltage for relay 48 without the need for separate relay switch contacts 28, or the entire relay 48 may be incorporated into the circuits 26. Another variation in the apparatus would be that of energizing the entire unit 20 through the contacts 38a rather than only the capstan pinch solenoid 30. It will, of course, be understood that by the appended claims we intend to cover all variations and alternative constructions falling within their true spirit and scope.

What we claim as new and desire to secure by Letters Patent of the United States is:

1. A programming mechanism for use in sequentially energizing a group of devices in response to a momentary voltage condition across predetermined terminals as determined by the action of a reproducing device, and to deenergize the reproducing device upon termination of a prolonged period of said voltage condition, the programming mechanism comprising: means operable when energized to apply operating energy to the reproducing device; means defining a hold-in circuit for said means; a stepping switch having contacts operable to energize said group of devices, respectively, and a stepping member movable step-by-step to engage said contacts in succession; circuit means operable to actuate said stepping switch one step upon the event of a momentary voltage condition at said predetermined terminals, whereby the stepping switch is advanced step-by-step in response to the momentary voltage conditions; circuit means operative to break said seal-in of said first means in response to a prolonged existence of said voltage condition; means operable in response to said voltage condition to define an alternate seal-in circuit for said first means; and means operable to break said alternate circuit when said prolonged voltage condition comes to an end.

2. A programming mechanism for use in sequentially energizing a group of devices in response to a momentary voltage condition across predetermined terminals as determined by the action of a reproducing device, and to deenergize the reproducing device upon termination of a prolonged period of said voltage condition, the programming mechanism comprising: means operable when energized to apply operating energy to the reproducing device; means defining a hold-in circuit for said means; a stepping switch having contacts operable to energize said group of devices, respectively, and a stepping member movable step-by-step from a home position to engage said contacts in succession; circuit means operable to actuate said stepping switch one step upon the event of a momentary voltage condition at said predetermined terminals, whereby the stepping switch is advanced step-by-step in response to the momentary voltage conditions; circuit means operative to break the seal-in of said first means in response to a prolonged existence of said voltage condition; means operable in response to said voltage condition to define an alternate seal-in circuit for said first means; means operable to break said alternate circuit when said prolonged voltage condition ceases to exist, and means responsive to the prolonged voltage condition to return the stepping switch to home position.

3. A programming mechanism for use in sequentially energizing a group of devices in response to a momentary actuation of a control switch in response to the action of a reproducing device, and to deenergize the reproducing device upon termination of a prolonged period of said control switch actuation, the programming mechanism comprising: means operable when energized to apply operating energy to the reproducing device; means defining a hold-in circuit for said means; a stepping switch having contacts operable to energize said group of devices, respectively, and a stepping member movable step-by-step to engage said contacts in succession; circuit means operable to actuate said stepping switch one step upon the event of a momentary control switch actuation, whereby the stepping switch is advanced step-by-step in response to the momentary control switch actuations; circuit means operative to break the seal-in of said first means in response to a prolonged control switch actuation; means operable in response to said control switch actuation to define an alternate seal-in circuit for said first means; and means operable to break said alternate circuit when said prolonged control switch actuation ceases to exist.

4. A programming mechanism for use in sequentially energizing a group of devices in response to a momentary actuation of a control switch in response to the action of a reproducing device, and to deenergize the reproducing device upon termination of a prolonged period of said control switch actuation, the programming mechanism comprising: a control relay having at least a pair of contacts; means to energize said relay to close said contacts when said control switch is actuated; energizing means operable when energized to apply operating energy to the reproducing device; means defining a hold-in circuit for said energizing means; a stepping switch having contacts operable to energize said groups of devices, respectively, and a stepping member movable step-by-step to engage said contacts in succession; circuit means operable to actuate said stepping switch one step upon the event of a momentary control switch actuation, whereby the stepping switch is advanced step-by-step in response to the momentary control switch actuation; circuit means operative to break the seal-in of said first means in response to a prolonged existence of said voltage condition; means defining an alternate seal-in circuit to said energizing means through said pair of contacts; and means operable to break said alternate circuit when said prolonged control switch actuation ceases to exist.

5. A programming mechanism for use in sequentially energizing a group of devices in response to a momentary actuation of a control switch in response to the action of a reproducing device, and to deenergize the reproducing device upon termination of a prolonged period of said control switch actuation, the programming mechanism comprising: a control relay having at least a pair of contacts; means to energize said relay to close said contacts when said control switch is actuated; energizing means operable when energized to apply operating energy to the reproducing device; means defining a hold-in circuit for said energizing means; a stepping switch having contacts operable to energize said group of devices, respectively, and a stepping member movable step-by-step from home position to engage said contacts in succession; circuit means operable to actuate said stepping switch one step upon the event of a momentary control switch actuation, whereby the stepping switch is advanced step-by-step in response to the momentary control switch actuations; circuit means operative to break the seal-in of said first means in response to a prolonged existence of said voltage condition; means defining an alternate seal-in circuit to said energizing means through said pair of contacts; means operable to break said alternate circuit when said prolonged control switch actuation ceases to exist; and means responsive to the prolonged control switch actuation to return the stepping switch to home position.

6. In combination: a reproducing device having means operable to repeat a recorded program cycle of predetermined length, a program recorded on said means of less than said predetermined length, and a control switch operable momentarily during the program and for a prolonged period extending at least from the end of the program to the end of the program cycle, said control switch having contacts that close in response to operation of the same; a step switch; means operable to advance the step switch in response to operation of the control switch momentarily; means operable when momentarily actuated to energize the reproducing device and including an energizing circuit interrupted upon prolonged operation of said control switch; and means defining an alternative energizing circuit to the reproducing device through said contacts of the control switch, whereby the reproducing device is energized through its full program cycle and is then deenergized.

References Cited in the file of this patent

UNITED STATES PATENTS

| | | |
|---|---|---|
| 1,814,263 | Reynolds | July 14, 1931 |
| 2,116,314 | Jenkins | May 3, 1938 |
| 2,362,827 | Joachim | Nov. 14, 1944 |
| 2,379,631 | Finckh | July 3, 1945 |
| 2,389,076 | Perry | Nov. 13, 1945 |